United States Patent
Cheeseman

[15] 3,686,357
[45] Aug. 22, 1972

[54] ROOM TEMPERATURE VULCANIZABLE SILICONE RUBBER STOCKS

[72] Inventor: Carl Anthony Cheeseman, c/o Midland Silicones Limited, Reading, England

[22] Filed: Nov. 19, 1970

[21] Appl. No.: 91,225

[30] Foreign Application Priority Data

Nov. 28, 1969 Great Britain..........58,320/69

[52] U.S. Cl. .........260/825, 117/123 D, 117/132 BS, 117/138.8 A, 117/138.8 UA, 117/148, 117/161 ZA, 161/207, 260/18 S, 260/37 SB, 260/46.5 G, 260/46.5 E, 260/448.2 N, 260/448.8 R
[51] Int. Cl. .........................C08g 47/02, C08g 47/06
[58] Field of Search..............................260/825, 185

[56] References Cited

UNITED STATES PATENTS

| 3,494,977 | 2/1970 | Heit | 260/825 |
|---|---|---|---|
| 3,449,289 | 6/1969 | Schank et al. | 260/825 |
| 3,247,281 | 4/1966 | Gagliardi | 260/825 |

*Primary Examiner*—Samuel H. Blech
*Attorney*—Robert F. Fleming, Jr., Laurence R. Hobey, Harry D. Dingman and Howard W. Hermann

[57] ABSTRACT

A silicone rubber stock which cures at room temperature under the influence of water and exhibits improved adhesion to substrates, particularly metals, is prepared by mixing a polyalkoxysilyl endblocked diorganosiloxane with a liquid siloxane containing amino or polyamino groups bonded to silicon and a curing catalyst.

8 Claims, No Drawings

ROOM TEMPERATURE VULCANIZABLE SILICONE RUBBER STOCKS

This invention relates to improved curable organopolysiloxane compositions.

It is known that diorganopolysiloxanes of the class in which each of the terminal silicon atoms has directly attached thereto two or three alkoxy radicals can be converted in the presence of a siloxane curing catalyst and water to the cured, elastic state. Diorganopolysiloxanes of this type, and curable compositions containing them, are described, for example, in U.K. Pat. Nos. 957,255 and 957,554. Although the elastomers obtained by curing compositions of this type in contact with a substrate adhere to some extent to the substrate, their adhesive properties in general leave something to be desired.

This lack of adhesion of the cured elastomer has limited the utility of the curable compositions in applications where adhesion is required, e.g. caulking, sealing and coating materials. In some cases, it has been possible to improve the adhesion of the cured product by the application of an adhesion promoting primer to the substrate. This operation, however, is time consuming and not always successful. We have now discovered that the adhesion to certain substrates of elastomers obtained by curing polymers of the type hereinabove described is improved if there is incorporated with the curable polymer an organosiloxane polymer having terminal silicon-bonded alkoxy radicals and in which a proportion of the organic radicals contain amino substituents.

Accordingly, this invention provides an improved composition which is stable in the absence of water and cures in the presence of water consisting essentially of a mixture of (a) a diorganopolysiloxane having a viscosity of at least 500 cs. at 25° C. and in which the terminal organosilyl groups have the general formula —$SiR_a(OR'_{3-a})$, wherein $a$ is 0 or 1, each R represents a monovalent hydrocarbon or halogenated hydrocarbon radical having less than seven carbon atoms and each R' represents an alkyl or alkoxyalkyl radical having less than seven carbon atoms, the remaining organic radicals in the diorganopolysiloxane being monovalent hydrocarbon radicals or monovalent halogenated hydrocarbon radicals containing one to 18 carbon atoms, (b) a liquid organosiloxane having terminal organosilyl groups of the general formula —$SiR''_b(OR''')_{3-b}$, wherein $b$ is 0 or 1, each R'' represents a monovalent hydrocarbon or halogenated hydrocarbon radical having less than seven carbon atoms or a radical —$QNX_2$ or —$QZ$ and each R''' represents an alkyl or alkoxyalkyl radical having less than seven carbon atoms, from 0.5 to 50 percent of the total silicon-bonded organic radicals in the liquid organosiloxane being radicals of the formula —$QNX_2$ or —$QZ$ wherein each X represents a hydrogen atom, an alkyl radical of less than seven carbon atoms or an aryl radical, Q represents a divalent hydrocarbon radical such that the —$NX_2$ group and the Z group are separated from the silicon atom by at least three and not more than 11 carbon atoms, and Z is a monovalent radical composed of carbon, nitrogen and hydrogen atoms which contains at least two amine groups and is attached to Q through a carbon to nitrogen linkage, the remaining non-terminal organic radicals in the organosiloxane containing one to 18 carbon atoms each and being monovalent hydrocarbon radicals, monovalent halogenated hydrocarbon radicals or monovalent hydrocarbonoxy radicals and the proportion of the organosiloxane (b) present being sufficient to provide from 1 to 200 —$QNX_2$, —$QZ$ radicals or both for every 2,500 total silicon atoms in (a) and (b), and (c) a curing catalyst for the siloxanes (a) and (b).

The invention also includes a process for the preparation of an article comprising a substrate having bonded thereto an elastomer which comprises applying to a substrate the curable composition of the invention and exposing the composition to water. The invention also includes an article when prepared by the process.

The curable diorganopolysiloxanes (a) are known materials and are characterized by having two or three alkoxy or alkoxyalkyl radicals attached to each terminal silicon atom in the molecule. Such diorganopolysiloxanes include, for example, those having the general formula:

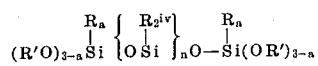

wherein $a$, R and R' are as herein before defined and $R^{iv}$ represents the organic radicals bonded to non-terminal silicon atoms, the organic radicals represented by $R^{iv}$ being monovalent hydrocarbon or halogenated hydrocarbon radicals of one to 18 carbon atoms, and $n$ is an integer such that the viscosity of the diorganopolysiloxane is at least 500 cs. at 25° C.

Polydiorganosiloxanes of this general formula can be prepared, for example, by the reaction of a trialkoxysilane or a tetra-alkoxysilane with a polysiloxane containing terminal silicon-bonded hydroxyl radicals. Preferably, such reaction should be performed in the presence of a catalyst such as an amine or employing other suitable conditions for promoting the reaction of ≡SiOH + R'OSi≡ → SiOSi + R'OH to liberate an alcohol. Such polydiorganosiloxanes and methods for their preparation are described, for example, in U.K. Pat. No. 957,255.

Also suitable for use as component (a) of the compositions of this invention are diorganopolysiloxanes wherein the terminal silicon atoms having attached alkoxy radicals are linked to the remainder of the polysiloxane chain by other than siloxane linkages, for example, by means of a divalent hydrocarbon radical or a divalent hydrocarbon radical containing oxygen in the form of ether groups. Polysiloxanes of this type can be represented, for example, by the general formula:

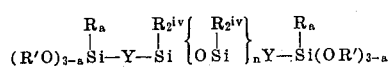

wherein $a$, $n$, R, R' and $R^{iv}$ have the values attributed hereinabove and Y represents a divalent hydrocarbon radical or oxygenated hydrocarbon radical, for example, the ethylene, propylene, butylene or polymethylene radicals of up to 19 carbon atoms.

Diorganopolysiloxanes wherein the terminal groups are linked to the polysiloxane chains through divalent hydrocarbon radicals are preferably prepared by the platinum catalyzed addition of an alkoxysilane containing a silicon-bonded unsaturated radical, for example, the vinyl radical, to a diorganopolysiloxane containing terminal silicon-bonded hydrogen atoms, as described, for example, in U.K. Pat. No. 957,554.

For the purpose of this invention, the non-terminal organic radicals $R^{iv}$ in the diorganopolysiloxane (a) can be monovalent hydrocarbon radicals, for example, alkyl radicals such as methyl, ethyl, propyl and octadecyl radicals, alkenyl radicals such as vinyl and allyl radicals, alkaryl radicals such as benzyl and phenylpropyl radicals and aromatic radicals such as phenyl and naphthyl radicals and monovalent halogenated hydrocarbon radicals such as chloromethyl, 2,2,2-trifluoroethyl and 3,3,3-trifluoropropyl. The terminal radical R can be any of those exemplified for $R^{iv}$ containing less than seven carbon atoms and the radicals R', which can be the same or different, are alkyl or or alkoxyalkyl radicals contained less than seven carbon atoms, for example, methyl, ethyl, propyl and methoxyethyl. The organic radicals R and $R^{iv}$ in the diorganopolysiloxane are preferably selected from methyl, phenyl, vinyl and trifluoropropyl radicals, at least about 50 percent of the total organic radicals being methyl radicals. In general, the most preferred diorganopolysiloxanes are those in which substantially all of the R and $R^{iv}$ radicals are methyl radicals.

The silicon-bonded alkoxy radicals present in the diorganopolysiloxane (a) should desirably be confined to those attached to the terminal silicon atoms. However, incidental hydrolysis and condensation during the preparation and storage of the diorganopolysiloxanes may give rise to the presence of a few alkoxy or alkoxyalkoxy radicals bonded to silicon atoms in non-terminal positions in the polysiloxane chain and it is to be understood that the diorganopolysiloxanes used in this invention can include those having such additional alkoxy or alkoxyalkoxy radicals. It should also be understood that although the diorganopolysiloxane (a) is desirably essentially linear in character, it can contain small proportions of chain branching units, for example, monoorganosiloxane units provided the polymer molecule remains substantially linear in configuration. Although the terminal silicon-bonded alkoxy or alkoxyalkoxy radicals —OR' present in (a) can be any of those containing less than seven carbon atoms, the methoxy radical is preferred.

The diorganopolysiloxanes (a) can vary in viscosity from freely flowing liquids having a viscosity of 500 cs. at 25° C. to highly viscous materials resembling gums, the viscosity chosen in any particular case being related for example, to the flow properties desired in the elastomer-forming composition. In general, we prefer to employ as diorganopolysiloxanes (a) those having a viscosity within the range from 1,000 to 10,000 cs. at 25° C.

Component (b) of the compositions of this invention is an organosiloxane polymer containing terminal organosilyl radicals of the formula —$SiR''_b(OR''')_{3-b}$ in which $b$ has a value of 0 or 1 and in which R'' and R''' are as defined and exemplified herein for R and R' respectively except that R'' can also represent the amino groups —$QNX_2$ and —QZ, Q, X and Z being as defined herein. Preferably, R'' is methyl and R''' is methyl, ethyl or propyl, and in a given composition the terminal organosilyl radicals in (b) can be the same as or different from those present in (a).

The organosiloxane (b) should be approximately linear in structure but some branching of the polymeric chain is permissible provided that the organosiloxane (b) is liquid and is soluble in organic solvents. Thus, liquid organosiloxanes (b) can be of a similar configuration to (a) and include those whose structure can be represented by the general formula given herein for (a) wherein a proportion of the $R^{iv}$ groups are the specified amino-substituted groups and can also, in some cases, represent hydrocarbon radicals and chain branching siloxane linkages. However, the organosiloxane (b) can vary in molecular weight from that corresponding to a molecule containing as few as 5 silicon atoms to that corresponding to a barely flowable polymer having a viscosity of up to 100,000 cs. at 25° C. From 0.5 to 50 percent of the total silicon-bonded organic radicals in the liquid organosiloxane (b) should be the specified —$QNX_2$ or —QZ radicals wherein Q represents a divalent alkylene radical such that the —$NX_2$ and Z groups are joined to the silicon atom through at least three and not more than 11 carbon atoms, each X represents the hydrogen atom or an alkyl or aryl radical, for example, the methyl, ethyl, hexyl, octadecyl, phenyl or naphthyl radicals, each X preferably being hydrogen and Z denotes a monovalent radical composed of carbon, nitrogen and hydrogen and containing at least two amino groups and not more than 18 carbon atoms. Examples of the operative —$QNX_2$ and —QZ substituents, therefore, are —$(CH_2)_3NH_2$, —$(CH_2)_3NH(CH_3)$, —$(CH_2)_4NH_2$,

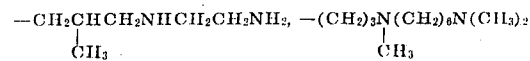

and —$(CH_2)_3NHCH_2CH_2NH_2$, the latter being preferred.

As the remaining organic radicals bonded to non-terminal silicon atoms, there are present in the organosiloxane (b) monovalent hydrocarbon radicals, for example, alkyl radicals such as methyl, ethyl, propyl and butyl radicals, alkenyl radicals such as vinyl and allyl and aryl-containing radicals such as phenyl, benzyl and naphthyl, monovalent halogenohydrocarbon radicals, for example, chloromethyl, dichlorophenyl and trifluoropropyl radicals and hydrocarbonoxy radicals, for example, methoxy, ethoxy and methoxyethyl. Preferably, the remaining organic radicals are all methyl radicals with optionally up to about 10 percent of the total organic radicals being alkoxy radicals. When present, R'' is preferably methyl but can also be, for example, the ethyl, propyl, butyl, trifluoropropyl or the specified amino radicals.

The organosiloxane (b) can be prepared, for example, by the reaction of a silanol-terminated diorganopolysiloxane containing the desired proportion of non-terminal amino-substituted organic radicals with an alkoxysilane containing a silanol reactive radical or atom, e.g. an alkoxy radical or chlorine atom. Suitable alkoxysilane reactants include, for example, methyltrimethoxysilane and dimethoxymethylchlorosilane. The amino-substituted, silanol terminated organosiloxane reactant can be prepared by the application of known techniques, for example, by the copolymerization of a cyclic diorganosiloxane, e.g. octamethylcyclotetrasiloxane, with an amino-substituted cyclosiloxane, e.g. methyl(β-amino ethyl-gamma-aminopropyl)-cyclotrisiloxane, under conditions which give rise to terminal silanol groups in the copolymer. Alternatively, the organosiloxane (b) can be prepared by the condensation of a silanol terminated diorganopolysiloxane with a dialkoxysilane or a trialkoxysilane containing the required amino-substituted organic group under conditions which permit reaction of two of the alkoxy radicals with the silanol groups and formation of a silanol terminated copolymer which is then further reacted with an alkyltrialkoxysilane to provide the specified alkoxysilyl terminal groups.

Although up to 50 percent of the total non-terminal organic radicals in the organosiloxane (b) can be the specified amino-substituted organic radicals, the inclusion of this proportion can cause a significant increase in the viscosity of the polymer depending on the nature of X and Z. The use of high viscosity organosiloxanes (b) can give rise to difficulty in mixing components (a) and (b) and for this reason we prefer to employ as organosiloxanes (b) those in which the amino-substituted organic radicals are present in a proportion of from 1 to 10 percent of the total organic substituents bonded to non-terminal silicon atoms.

Sufficient of the organosiloxane (b) should be employed to provide from 1 to 200 —QNX$_2$, —QZ radicals or mixtures thereof, for every 2,500 total silicon atoms in (a) and (b). Preferably, the organosiloxane (b) is employed in a proportion providing from 3 to 20 —QNX$_2$ or —QZ radicals for every 1,000 total silicon atoms.

As component (c) of the curable compositions of this invention, there is employed any siloxane curing catalyst which is not adversely affected by the presence of the amino-substituents in the organosiloxane (b). The preferred curing catalysts are the metal salts of carboxylic acids, for example, zinc naphthenate, cobalt naphthenate, dibutyltin dioctoate, dibutyltin diacetate and dibutyltin dilaurate, the latter being most preferred.

The proportion of catalyst employed is not narrowly critical and can be varied depending on the particular catalyst and the curing properties desired in the composition. Normally, however, from 0.1 to 5 percent by weight based on the weight of the diorganopolysiloxane (a) is used.

The compositions of this invention can be prepared by merely mixing the ingredients (a), (b) and (c) in the desired proportions. As the compositions are sensitive to water, they should be mixed under substantially anhydrous conditions if they are to be stored for any significant period of time prior to use. The storage stability of the composition can also be improved by including in the composition a water reactive silane, e.g. methyltrimethoxysilane as a scavenger for residual moisture. For most applications, it is preferred to include fillers and other additives in the curable compositions to improve or otherwise modify the physical or other properties of the cured composition. Fillers which can be incorporated into the compositions of this invention include fume silicas, precipitated silicas, ground quartz, diatomaceous earths, zirconium silicate, barium zirconate, barium oxide, titanium dioxide, calcium carbonate, carbon blacks and other fillers commonly employed in organosiloxane elastomer stocks. If desired, the fillers can be specially treated, e.g. with a silane or siloxane. Other additives which can also be incorporated are pigments and heat stability additives, for example, ferric oxide, ferric hydroxide and cerium hydrate and aromatics.

The compositions of this invention are sensitive to water and cure to elastomers on exposure to atmospheric moisture at room temperature. They can, therefore, be employed in all applications where the so-called one-component, room-temperature vulcanizing silicone rubbers find use, for example, in caulking, sealing, coating, electrical insulation and mold making. When the compositions are cured in contact with a wide variety of substrates, the cured product exhibits adhesion to the substrates which is superior to that shown by the analogous prior art materials. The compositions of the invention, therefore, find particular application as coating materials and curable adhesives for use with, for example, surfaces of metals, brick, concrete, glass, wood, epoxy resins, polyesters and phenolics.

The following examples in which the parts are expressed by weight illustrate the invention. The scope of the invention is delineated in the claims. All of the equivalent diorganosiloxanes set forth in the above disclosure can be substituted for the dimethoxymethylsilyl endblocked dimethylpolysiloxane (a), all of the aminoalkyl diorganosiloxanes (b) illustrated above and all the known fillers and curing catalysts previously known for use in silicone elastomers can be employed in the examples with equivalent results being achieved. The examples are merely representative of the invention and present the preferred method of operation.

EXAMPLE 1

A vulcanizable composition was prepared by mixing in the substantial absence of moisture the following materials.

Polydimethylsiloxane having terminal $$-\text{O}\overset{\underset{\displaystyle |}{\text{CH}_3}}{\text{Si}}(\text{OCH}_3)_2$$

groups and viscosity of 7,000 cs. at 25° C. – 72.7 parts

Fume silica pretreated with methylsilanes – 17.5 parts

CH$_3$Si(OCH$_3$)$_3$ – 2.6 parts

Copolymer of 93 mol percent dimethylsiloxane units and 7 mol percent methyl(N-beta-aminoethyl-gamma-aminopropyl)-siloxane units, terminated with —OSiCH$_3$(OCH$_3$)$_2$ 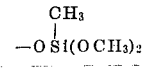 groups and having a M.W. of 5,000 – 9.7 parts Dibutyltin dilaurate – 0.5 parts The composition was then applied as a coating to the surface of a degreased but unprimed aluminum panel, the dimensions of the coating being 0.5 × 1.0 inches by 0.017 inches thick. A similar aluminum panel was then placed on the coating to overlap it completely and the composite allowed to stand at room temperature and humidity (22° C. and 65 percent RH) for 7 days.

The lap shear adhesion of the vulcanized composition was then determined by measuring the force (p.s.i.) required to separate the panels by pulling in a direction parallel to the longitudinal axis of the composite. A value of 239 was obtained.

When the test was repeated on panels of copper and mild steel, values of 107 and 180 were obtained.

The tests were repeated with an equivalent formulation containing the same ratio of silica to polydimethylsiloxane but free of the aminoalkyl copolymer additive. Values of 186 for aluminum, 106 for mild steel and 73 for copper were obtained.

EXAMPLE 2

A vulcanizable composition was prepared by mixing in the dry the following materials.

Polydimethylsiloxane having terminal

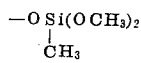

groups and viscosity of 7,000 cs. at 25° C. – 77.5 parts

Fume silica rendered hydrophobic by pretreatment with methylsilane – 15.7 parts $CH_3Si(OCH_3)_3$ – 2.6 parts Copolymer of 93 mol percent dimethylsiloxane units and 7 mol percent of methoxy(N-beta-aminoethyl-gamma-aminopropyl)-siloxane units, terminated with —$OSiCH_3(OCH_3)_2$ groups and having a M.W. of 5,000 – 6.7 parts Dibutyltin dilaurate – 0.5 parts The adhesive properties of the composition after vulcanization were measured as described in Example 1. Values of 333 p.s.i., 344 p.s.i. and 312 p.s.i. were obtained for aluminum, copper and mild steel, respectively. In each case, failure was almost totally cohesive.

The composition also showed excellent adhesion to polycarbonate, neoprene, glass, etched polytetrafluoroethylene, brick, soft wood, epoxy resin, silicone resin laminate and nylon, when allowed to cure in contact with substrates of each of these materials.

That which is claimed is:

1. A curable composition comprising (a) a diorganopolysiloxane having a viscosity of at least 500 cs. at 25° C. and in which the terminal organosilyl groups have the general formula —$SiR_a(OR')_{3-a}$ wherein $a$ is 0 or 1, each R represents a monovalent hydrocarbon or halogenated hydrocarbon radical having less than seven carbon atoms and each R' represents an alkyl or alkoxyalkyl radical having less than seven carbon atoms, the remaining organic radicals in the diorganopolysiloxane being monovalent hydrocarbon radicals or monovalent halogenated hydrocarbon radicals containing 1 to 18 carbon atoms, (b) an essentially linear liquid organosiloxane having terminal organosilyl groups of the general formula —$SiR''_b(OR''')_{3-b}$ wherein $b$ is 0 or 1, each R'' represents a monovalent hydrocarbon or halogenated hydrocarbon radical having less than seven carbon atoms or a radical —$QNX_2$ or —$QZ$ and each R''' represents an alkyl or alkoxyalkyl radical having less than seven carbon atoms, from 0.5 to 50 percent of the total silicon-bonded organic radicals in the liquid organosiloxane being radicals of the formula —$QNX_2$ or —$QZ$ wherein each X represents a hydrogen atom, an alkyl radical of less than seven carbon atoms or an aryl radical, Q represents a divalent hydrocarbon radical such that the —$NX_2$ group and the Z group are separated from the silicon atom by at least three and not more than 11 carbon atoms, and Z is a monovalent acyclic radical composed of carbon, nitrogen and hydrogen atoms which contains not more than 18 carbon atoms and at least two amine groups and is attached to Q through a carbon to nitrogen linkage, the remaining non-terminal organic radicals in the organosiloxane containing one to 18 carbon atoms each and being monovalent hydrocarbon radicals, monovalent halogenated hydrocarbon radicals or monovalent hydrocarbonoxy radicals and the proportion of organosiloxane (b) present being sufficient to provide from 1 to 200 —$QNX_2$, —$QZ$ radicals or mixtures thereof, for every 2,500 total silicon atoms in (a) and (b), and (c) a curing catalyst for the siloxanes (a) and (b).

2. A composition as claimed in claim 1 wherein the R'' radicals and substantially all of the radicals bonded to non-terminal silicon atoms in polydiorganosiloxane (a) are methyl radicals.

3. A composition as claimed in claim 1 wherein the diorganopolysiloxane (a) has a viscosity within the range from 1,000 to 10,000 cs. at 25° C.

4. A composition as claimed in claim 1 wherein in the liquid organosiloxane (b) the silicon-bonded amino-substituted radicals —$QZ$ are radicals of the formula —$(CH_2)_3NHCH_2CH_2NH_2$.

5. A composition as claimed in claim 1 wherein the proportion of liquid organosiloxane (b) present is sufficient to provide from 3 to 20 —$QNX_2$ or —$QZ$ radicals for every 1,000 total silicon atoms in (a) and (b).

6. A composition as claimed in claim 1 which also contains a filler.

7. A process for the production of an article comprising a substrate having bonded thereto an organopolysiloxane elastomer which comprises applying to a substrate a curable composition as claimed in claim 1 and exposing the composition to water.

8. An article comprising a substrate having bonded thereto an organopolysiloxane elastomer as defined in claim 1.

* * * * *